United States Patent
Russell

(10) Patent No.: US 10,773,956 B2
(45) Date of Patent: Sep. 15, 2020

(54) METHOD FOR USING NATURAL GAS FUEL TO IMPROVE PERFORMANCE OF PRESSURE SWING ADSORPTION HYDROGEN UNIT IN AN INTEGRATED FACILITY

(71) Applicant: UOP LLC, Des Plaines, IL (US)

(72) Inventor: Bradley P. Russell, Wheaton, IL (US)

(73) Assignee: UOP LLC, Des Plaines, IL (US)

( * ) Notice: Subject to any disclaimer, the term of this patent is extended or adjusted under 35 U.S.C. 154(b) by 213 days.

(21) Appl. No.: 16/110,529

(22) Filed: Aug. 23, 2018

(65) Prior Publication Data

US 2019/0194017 A1   Jun. 27, 2019

Related U.S. Application Data

(60) Provisional application No. 62/610,795, filed on Dec. 27, 2017.

(51) Int. Cl.
*B01D 53/047* (2006.01)
*C01B 3/56* (2006.01)
(Continued)

(52) U.S. Cl.
CPC ............ *C01B 3/508* (2013.01); *B01D 53/047* (2013.01); *C01B 3/32* (2013.01); *B01D 2253/104* (2013.01); *B01D 2253/106* (2013.01); *B01D 2256/16* (2013.01); *B01D 2256/22* (2013.01); *B01D 2257/7022* (2013.01); *B01D 2257/7025* (2013.01); *B01D 2259/40009* (2013.01); *B01D 2259/40035* (2013.01); *B01D 2259/40056* (2013.01); *C01B 2203/025* (2013.01);
(Continued)

(58) Field of Classification Search
CPC ............ B01D 53/047; B01D 2253/104; B01D 2253/106; B01D 2256/16; B01D 2256/22; B01D 2257/7022; B01D 2257/7025; B01D 2259/40009; B01D 2259/40035; B01D 2259/40056; C01B 3/32; C01B 3/508; C01B 3/56; C01B 2203/0227; C01B 2203/025; C01B 2203/042; C01B 2203/0475
USPC ...................... 95/96, 97, 104, 139
See application file for complete search history.

(56) References Cited

U.S. PATENT DOCUMENTS

| 4,475,929 A | 10/1984 | Fuderer |
| 4,813,980 A * | 3/1989 | Sircar ................ B01D 53/0476 423/359 |

(Continued)

FOREIGN PATENT DOCUMENTS

| EP | 0411506 A1 * | 2/1991 |
| RU | 2288774 C2 | 1/2006 |

(Continued)

OTHER PUBLICATIONS

International Search Report and Written Opinion for corresponding International application PCT/US2018/067490 dated Mar. 28, 2019.

*Primary Examiner* — Frank M Lawrence, Jr.

(57) ABSTRACT

A process is disclosed for increasing hydrogen recovery in an integrated refinery and petrochemical complex in which natural gas is used as a co-purge gas in a pressure swing adsorption unit. This natural gas is recovered in tail gas from the pressure swing adsorption unit. This process is useful for refinery off-gas and partial oxidation feeds.

17 Claims, 3 Drawing Sheets

(51) Int. Cl.
*C01B 3/50* (2006.01)
*C01B 3/32* (2006.01)

(52) U.S. Cl.
CPC ........ *C01B 2203/0227* (2013.01); *C01B 2203/042* (2013.01); *C01B 2203/0475* (2013.01)

(56) References Cited

U.S. PATENT DOCUMENTS

| | | | |
|---|---|---|---|
| 2010/0287981 A1* | 11/2010 | Chen | C01B 3/56 62/619 |
| 2014/0186255 A1* | 7/2014 | Jadhav | C01B 3/508 423/437.1 |
| 2014/0186257 A1* | 7/2014 | Jadhav | C01B 3/382 423/650 |

FOREIGN PATENT DOCUMENTS

| | | |
|---|---|---|
| WO | 2008115076 A2 | 9/2008 |
| WO | 2009105664 A2 | 8/2009 |
| WO | 2014099593 A1 | 6/2014 |

* cited by examiner

METHOD FOR USING NATURAL GAS FUEL TO IMPROVE PERFORMANCE OF PRESSURE SWING ADSORPTION HYDROGEN UNIT IN AN INTEGRATED FACILITY

CROSS-REFERENCE TO RELATED APPLICATION

This application claims priority from U.S. Provisional Application No. 62/610,795 filed Dec. 27, 2017, the contents of which cited application are hereby incorporated by reference in its entirety.

BACKGROUND OF THE INVENTION

Hydrogen is a valuable product that is used in refining and petrochemicals processing, and methods are needed to increase hydrogen recovery from pressure swing adsorption (PSA) units. This is especially true in regions where hydrogen has a high value and current practice uses added compression power (vacuum regeneration, tail-gas recycle, or two PSAs in series) to increase hydrogen recovery. This invention disclosure proposes an alternative approach that can be applied in refineries and refinery/petrochemical complexes where natural gas is used as fuel. While fuel oil or fuel gas is often used for the fuel requirements of refineries and petrochemical plants, in some cases it is desirable to use natural gas for process and utility heaters and for electricity generation with gas turbines to reduce or eliminate fuel oil generation from the refinery by utilizing bottom of the barrel processing technology.

In the case of the use of natural gas to provide the fuel needed for the operation of the refinery, it has now been found that the natural gas can be used as a co-purge stream in the pressure swing adsorption unit to increase hydrogen recovery. As shown herein, this approach provides economic, safety, and operational/reliability advantages compared to current practices by eliminating a vacuum compressor and thereby reducing compression power requirements.

SUMMARY OF THE INVENTION

This invention provides a new, economically attractive option for achieving high levels of hydrogen recovery, compared with current options based on vacuum regeneration, tail-gas recycle, or two PSAs in series. This new approach can be applied when natural gas is used as fuel in the facility, which can be especially attractive in integrated refinery/petrochemical complexes. In this case, natural gas is used as a co-purge in the PSA unit to extract additional hydrogen. The natural gas is recovered in a PSA tail gas and retains its value as fuel. The concept of using an external purge or co-purge stream to increase hydrogen recovery is known in the art. However, in the past natural gas has not been used for this purpose and the benefits of this approach were not apparent until a detailed simulation study was conducted.

DETAILED DESCRIPTION OF THE INVENTION

Pressure swing adsorption processes utilize the fact that under high pressure, gases tend to be attracted to solid surfaces, or "adsorbed". The higher the pressure, the more gas is adsorbed. When the pressure is reduced, the gas is released, or desorbed. PSA processes can be used to separate gases in a mixture because different gases tend to be attracted to different solid surfaces more or less strongly.

Using two or more adsorbent vessels allows continuous production of the product gas. It also permits so-called pressure equalization, where the gas leaving the vessel being depressurized is used to partially pressurize the second vessel. This results in higher recovery of the light gas (hydrogen), and is common industrial practice.

Figure 1:
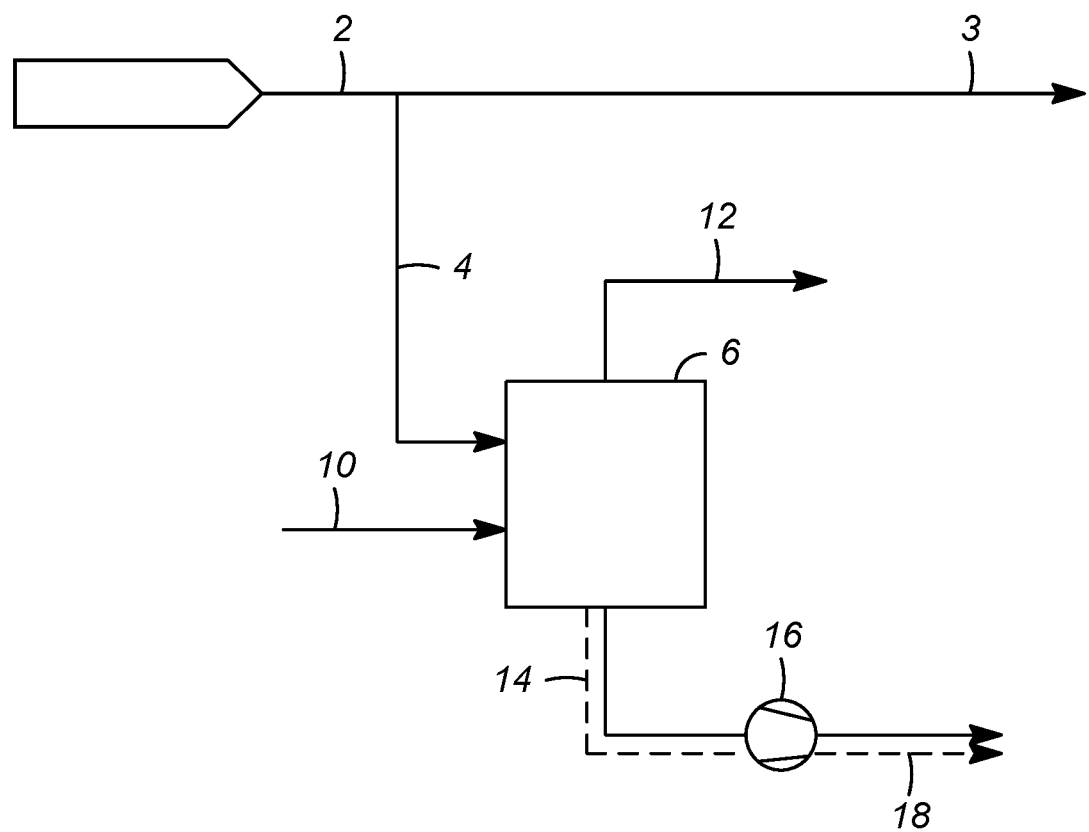
FIG. 1 is a basic flow scheme for the invention.

A schematic diagram of the natural gas co-purge of a PSA unit or vessel is shown in FIG. 1. A stream 2 of natural gas is shown to be optionally used as refinery fuel 3. A portion of the natural gas stream 4 is sent to a PSA unit 6 for use as a co-purge gas in the PSA cycle. The PSA unit 6 is used to purify a hydrogen containing feed 10 with purified hydrogen product stream 12 exiting from the top of PSA unit 6 and a low-pressure tail gas stream 14 exiting the other side of the PSA unit 6 to be compressed at compressor 16 and exit in fuel gas stream 18. The slipstream of natural gas fuel is used in the PSA unit to result in the production of additional hydrogen. This natural gas is recovered in PSA tail gas. The cost for extracting this additional hydrogen is recompression of the natural gas (assumed available at PSA feed pressure) in the existing (now larger) tail gas compressor.

Figure 2:
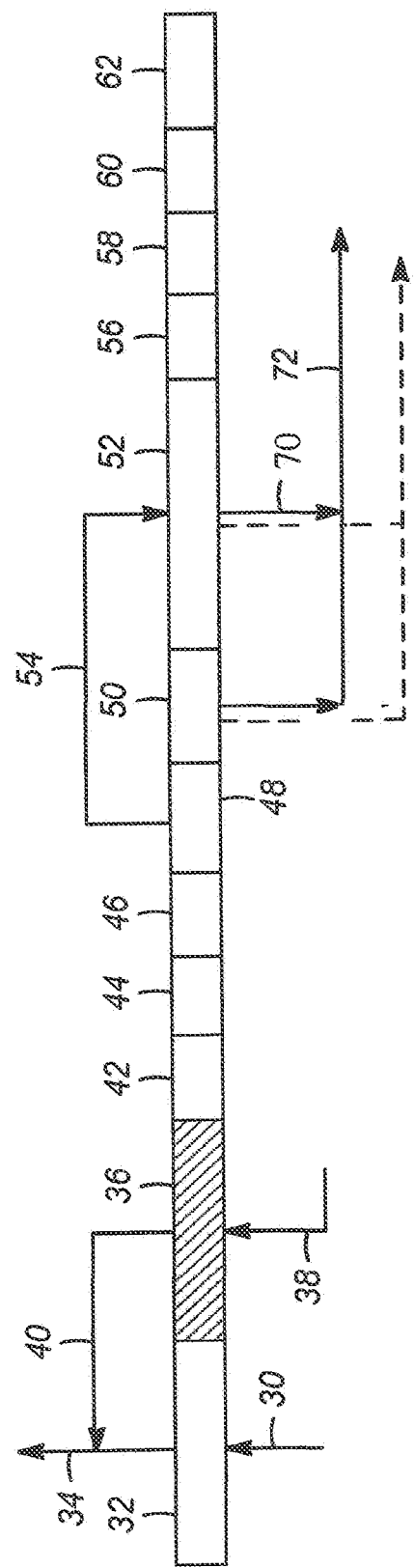
FIG. 2 shows the pressure swing adsorption cycle for the invention.

The method for using this natural gas in a PSA cycle is shown in FIG. 2. A high-pressure natural-gas co-purge step is used following the normal high-pressure adsorption (ADS) step. During this co-purge step, natural gas is fed to the bottom (feed end) of the bed and pushes out additional pure hydrogen from the top (product end) of the bed. This additional hydrogen is combined with product hydrogen from the main Adsorption step. FIG. 2 shows an abbreviated form of the overall PSA cycle (called a sub-cycle) and are routinely used by practitioners to capture the minimum amount of required information to represent the complete multi-bed PSA cycle. These sub-cycles are replicated according to known procedures (with each row corresponding to one bed) in order to produce complete cycle charts. It is understood that other variations of cycle details are possible. FIG. 2, from left to right, shows a hydrogen feed 30 entering an adsorbent bed 32 from below. A hydrogen product stream 34 is produced. A natural gas stream 38 is used to purge at 36 with additional hydrogen 40 released and combined with hydrogen product 34. Next are three depressurization (equalization) steps 42, 44 and 46 shown with a flow in the upward direction (same direction as Adsorption and natural gas co-purge) and then there is provide purge step 48, blow down step 50, purge step 52, three re-pressurization (equalization) steps 56, 58 and 60 in a downward direction, followed by re-pressurization 62. Purge gas 54 and PSA tail gas 70 and 72 are shown.

An example using typical refinery off-gas (ROG) and partial oxidation (PDX) PSA conditions is shown in Table 1. These feed gas conditions were simulated using the cycle in FIG. 2 with a PSA process model.

TABLE 1

Feed Gas to Refinery Off-Gas (ROG) and Partial Oxidation (POX) PSA Units

|  | ROG | POX | Natural Gas |
|---|---|---|---|
| Pressure, psia | 350 | 350 | 350 |
| Flow, mmscfd | 150 | 150 | variable |
|  | Mol % | Mol % | Mol % |
| H2 | 85.0 | 96.8 | — |
| C1 | 8.0 | 1.0 | 93.0 |
| C2 | 4.0 | — | 5.0 |
| C3 | 2.0 | — | 1.0 |
| C4+ | 1.0 | — | 0.5 |
| CO | — | 1.0 | — |
| N2 | — | 1.0 | 0.5 |
| Argon | — | 0.15 | — |
| CO2, ppmv | — | 100 | 50 |

Figure 3:
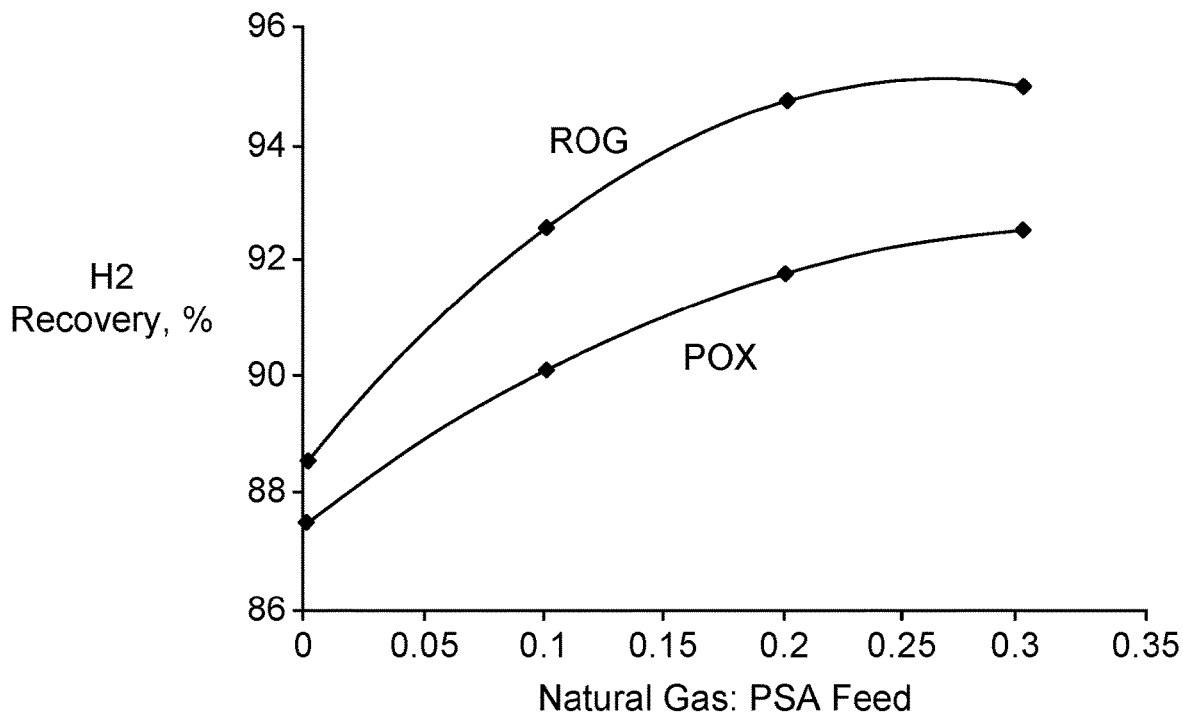
FIG. 3 is a graph of hydrogen recovery against natural gas:PSA feed ratio.
Figure 4:
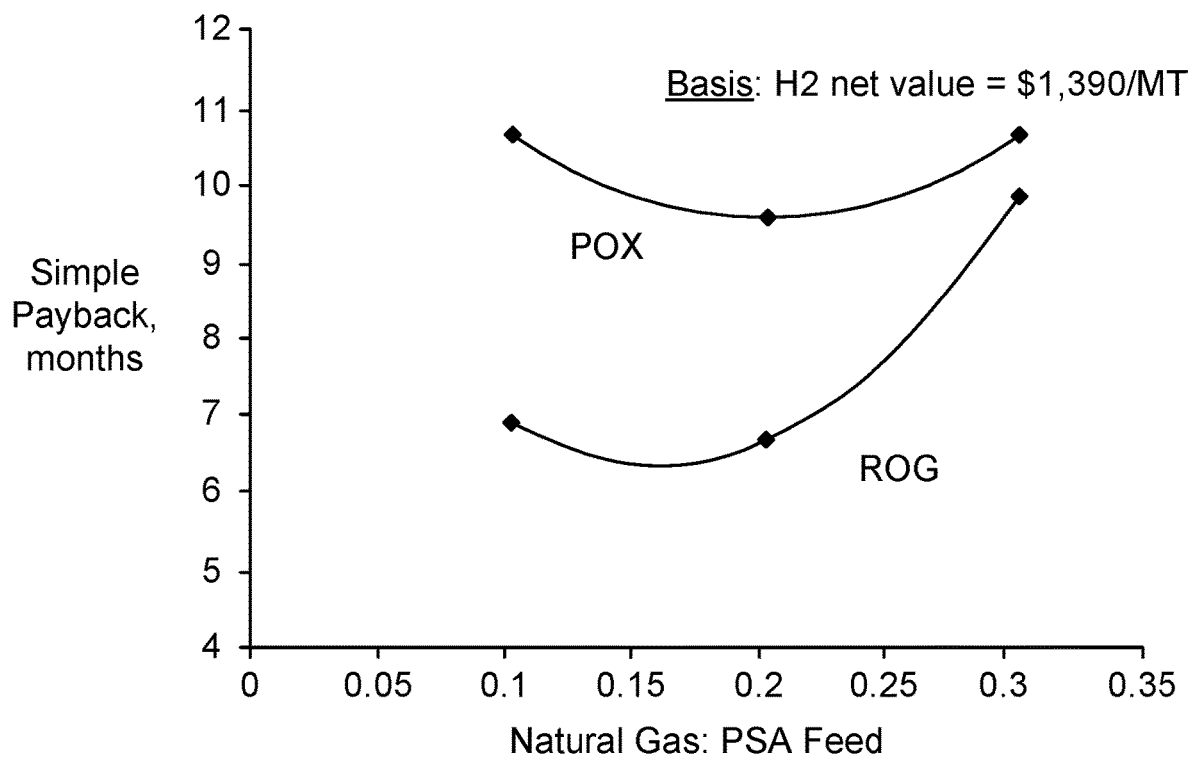
FIG. 4 is a graph of simple payback against natural gas:PSA feed ratio.

As shown in FIGS. 3 and 4, hydrogen recovery increases with increasing natural gas:PSA feed ratio. Hydrogen recovery increases by up to 6 percentage points for the refinery off-gas case and up to 5 percentage points for the partial oxidation case. The increase is lower in the partial oxidation case since alumina and silica gel adsorbents need to be included at the bottom of the bed as a protective layer for natural-gas components, whereas no adsorbent change is necessary for refinery off-gas. Also shown in FIG. 3 is a simple payback evaluation. The added CAPEX is due to higher cost PSA (two additional beds and slightly larger bed volume) and larger tail gas compressor. From the payback curves, we see that the optimum natural gas:PSA feed ratio is 15 to 20%.

Finally, a comparison with prior-art schemes is shown in Table 2. Advantages of the natural-gas cofeed PSA are: (1) no vacuum compressor, and (2) significantly lower power requirement.

TABLE 2

|  | Natural gas co-purge | VPSA | Tail Gas Recycle |
|---|---|---|---|
| ROG PSA Feed Flow, mmscfd | 150 | 150 | 150 |
| Nat. Gas Flow, mmscfd | 27 | — | — |
| Product H2 Purity, mol % | 99.9 | 99.9 | 99.9 |
| H2 Recovery, % | 94.0 | 94.0 | 94.0 |
| Vacuum Compression kW | — | 2,490 | — |
| Tail Gas Compression, kW | 3,810 | 2,220 | 9,070 |
| Total Power, kW | 3,810 | 4,710 | 9,070 |

Any of the above conduits, unit devices, scaffolding, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

Specific Embodiments

While the following is described in conjunction with specific embodiments, it will be understood that this description is intended to illustrate and not limit the scope of the preceding description and the appended claims.

A first embodiment of the invention is a process for purifying a hydrogen containing feed with less than about 1 mol % carbon dioxide comprising sending the hydrogen containing feed to a pressure swing adsorption unit, purging the pressure swing adsorption unit with a natural gas stream in the same flow direction as the hydrogen containing feed, recovering a product stream comprising more than about 99 mol % hydrogen and a fuel gas stream. An embodiment of the invention is one, any or all of prior embodiments in this paragraph up through the first embodiment in this paragraph wherein the natural gas stream displaces hydrogen from the pressure swing adsorption unit resulting in hydrogen recovery improvement of at least about 4 percentage points. An embodiment of the invention is one, any or all of prior embodiments in this paragraph up through the first embodiment in this paragraph wherein the product stream comprises more than about 99.5 mol % hydrogen. An embodiment of the invention is one, any or all of prior embodiments in this paragraph up through the first embodiment in this paragraph further comprising recovering the natural gas stream with a tail gas stream from the pressure swing adsorption unit. An embodiment of the invention is one, any or all of prior embodiments in this paragraph up through the first embodiment in this paragraph further comprising purging the pressure swing adsorption unit in a counter-current direction with respect to the hydrogen containing feed with a second purge gas in addition to the natural gas stream. An embodiment of the invention is one, any or all of prior embodiments in this paragraph up through the first embodiment in this paragraph wherein the second purge gas comprises more than about 95 mol % hydrogen. An embodiment of the invention is one, any or all of prior embodiments in this paragraph up through the first embodiment in this paragraph wherein the hydrogen displaced from the pressure swing adsorption unit is combined with the product stream. An embodiment of the invention is one, any or all of prior embodiments in this paragraph up through the first embodiment in this paragraph wherein the hydrogen containing feed is obtained from a catalytic reforming process. An embodiment of the invention is one, any or all of prior embodiments in this paragraph up through the first embodiment in this paragraph wherein the hydrogen containing feed comprises more than about 82 mol % hydrogen. An embodiment of the invention is one, any or all of prior embodiments in this paragraph up through the first embodiment in this paragraph wherein the hydrogen containing feed is obtained from a partial oxidation process. An embodiment of the invention is one, any or all of prior embodiments in this paragraph up through the first embodiment in this paragraph wherein the hydrogen containing feed comprises more than about 90 mol % hydrogen. wherein said methane containing stream is natural gas. An embodiment of the invention is one, any or all of prior embodiments in this paragraph up through the first embodiment in this paragraph further comprising at least one of: sensing at least one parameter of the process and generating a signal from the sensing; sensing at least one parameter of the process and generating data from the sensing; generating and transmitting a signal; or generating and transmitting data.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by mole, unless otherwise indicated.

The invention claimed is:

1. A process for purifying a hydrogen containing feed with less than about 1 mol % carbon dioxide comprising sending said hydrogen containing feed to a pressure swing adsorption unit, purging said pressure swing adsorption unit with a methane containing stream comprising greater than about 80 mol % methane in the same flow direction as said hydrogen containing feed, recovering a product stream comprising more than about 99 mol % hydrogen and a fuel gas stream.

2. The process of claim 1 wherein said hydrogen containing feed comprises less than about 0.5 mol % carbon dioxide.

3. The process of claim 1 wherein said hydrogen containing feed comprises less than about 0.1 mol % carbon dioxide.

4. The process of claim 1 wherein said methane containing stream comprises less than about 2 mol % carbon dioxide.

5. The process of claim 1 wherein said hydrogen containing feed is a refinery off-gas stream.

6. The process of claim 1 wherein said methane containing stream displaces hydrogen from said pressure swing adsorption unit resulting in hydrogen recovery improvement of at least about 4 percentage points.

7. The process of claim 1 wherein said product stream comprises more than about 99.5 mol % hydrogen.

8. The process of claim 1 further comprising recovering said methane containing stream with a tail gas stream from said pressure swing adsorption unit.

9. The process of claim 1 further comprising purging said pressure swing adsorption unit in a counter-current direction with respect to said hydrogen containing feed with a second purge gas in addition to said methane containing stream.

10. The process of claim 5 wherein said second purge gas comprises more than about 95 mol % hydrogen.

11. The process of claim 2 wherein said hydrogen displaced from said pressure swing adsorption unit is combined with said product stream.

12. The process of claim 1 wherein said hydrogen containing feed is obtained from a catalytic reforming process.

13. The process of claim 1 wherein said hydrogen containing feed comprises more than about 82 mol % hydrogen.

14. The process of claim 1 wherein said hydrogen containing feed is obtained from a partial oxidation process.

15. The process of claim 10 wherein said hydrogen containing feed comprises more than about 90 mol % hydrogen.

16. The process of claim 1 wherein said methane containing stream is natural gas.

17. The process of claim 1, further comprising at least one of:
sensing at least one parameter of the process and generating a signal from the sensing;
sensing at least one parameter of the process and generating data from the sensing;
generating and transmitting a signal;
generating and transmitting data.

\* \* \* \* \*